US008627292B2

(12) United States Patent
Levanoni et al.

(10) Patent No.: US 8,627,292 B2
(45) Date of Patent: Jan. 7, 2014

(54) STM WITH GLOBAL VERSION OVERFLOW HANDLING

(75) Inventors: Yosseff Levanoni, Redmond, WA (US); David L. Detlefs, Issaquah, WA (US); Weirong Zhu, Kirkland, WA (US); Timothy L. Harris, Cambridge (GB); Michael M. Magruder, Carnation, WA (US); Matthew B. Tolton, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1055 days.

(21) Appl. No.: 12/370,742

(22) Filed: Feb. 13, 2009

(65) Prior Publication Data

US 2010/0211931 A1    Aug. 19, 2010

(51) Int. Cl.
G06F 9/44        (2006.01)
G06F 11/00       (2006.01)

(52) U.S. Cl.
USPC .............. 717/127; 717/124; 717/126; 714/15

(58) Field of Classification Search
None
See application file for complete search history.

(56) References Cited

U.S. PATENT DOCUMENTS

| 6,182,286 | B1 * | 1/2001 | Sigal et al. | 717/122 |
|---|---|---|---|---|
| 6,691,304 | B1 * | 2/2004 | Zhang et al. | 717/127 |
| 7,117,492 | B2 * | 10/2006 | Ikeda et al. | 717/170 |
| 7,536,517 | B2 * | 5/2009 | Harris | 711/150 |
| 7,774,647 | B2 * | 8/2010 | Vertes | 714/15 |
| 8,132,158 | B2 * | 3/2012 | Wang et al. | 717/127 |
| 2001/0018763 | A1 * | 8/2001 | Ikeda et al. | 717/3 |
| 2005/0155019 | A1 * | 7/2005 | Levine et al. | 717/127 |
| 2007/0028056 | A1 * | 2/2007 | Harris | 711/150 |
| 2007/0143741 | A1 | 6/2007 | Harris | |
| 2007/0169031 | A1 * | 7/2007 | Harris | 717/140 |
| 2007/0198978 | A1 * | 8/2007 | Dice et al. | 718/100 |
| 2007/0239943 | A1 | 10/2007 | Dice et al. | |
| 2008/0022054 | A1 | 1/2008 | Hertzberg et al. | |
| 2008/0120484 | A1 | 5/2008 | Zhang et al. | |
| 2008/0140962 | A1 | 6/2008 | Pattabiraman et al. | |
| 2008/0163220 | A1 | 7/2008 | Wang et al. | |
| 2008/0244354 | A1 * | 10/2008 | Wu et al. | 714/755 |
| 2008/0256074 | A1 * | 10/2008 | Lev et al. | 707/8 |
| 2009/0077540 | A1 * | 3/2009 | Zhou et al. | 717/126 |
| 2010/0180257 | A1 * | 7/2010 | Dern | 717/124 |

OTHER PUBLICATIONS

Harris, T., et al., Optimizing Memory Transactions, Proceedings of the 2006 ACM SIGPLAN conference on Programming language design and implementation, 2006, pp. 14-25, [retrieved on Aug. 26, 2013], Retrieved from the Internet: <URL:http://dl.acm.org/>.*

(Continued)

Primary Examiner — Thuy Dao
Assistant Examiner — Geoffrey St Leger (57) ABSTRACT

A software transactional memory system is provided with overflow handling. The system includes a global version counter with an epoch number and a version number. The system accesses the global version counter prior to and subsequent to memory accesses of transactions to validate read accesses of the transaction. The system includes mechanisms to detect global version number overflow and may allow some or all transactions to execute to completion subsequent to the global version number overflowing. The system also provides publication, privatization, and granular safety properties.

19 Claims, 8 Drawing Sheets

(56) References Cited

OTHER PUBLICATIONS

Minh, C. C., et al., An Effective Hybrid Transactional Memory System with Strong Isolation Guarantees, Proceedings of the 34th annual international symposium on Computer architecture, 2007, pp. 69-80, [retrieved on Aug. 26, 2013], Retrieved from the Internet: <URL:http://dl.acm.org/>.*

Harris et,al. "Transactional Memory: An Overview", Retrieved at<<http://intl.ieeexplore.ieee.org/iel5/40/4292046/04292053.pdf?tp=&isnumber=&arnumber=4292053>>, May-Jun. 2007, pp. 8-29.

Spear et al."Privatization Techniques for Software Transactional Memory", Retrieved at<<http://www.cs.rochester.edu/u/scott/papers/2007_TR915.pdf>>, Feb. 2007, pp. 1-17.

Menon et,al. " Practical Weak-Atomicity Semantics for Java STM", Retrieved at<<http://delivery.acm.org/10.1145/1380000/1378588/p314-menon.pdf?key1=1378588&key2=7622397121&coll=GUIDE&dl=GUIDE&CFID=39460839&CFTOKEN=71933308>>, pp. 314-325. (Published Jun. 16, 2008).

Scott et al."Conflict Detection and Validation Strategies for Software Transactional Memory", Retrieved at<<https://www.cs.rochester.edu/u/scott/papers/2006_DISC_conflict.pdf>>, p. 15. (Published Sep. 19, 2006).

SHAVIT1 et al."Transactional Locking II", Retrieved at<<http://research.sun.com/scalable/pubs/DISC2006.pdf>>, p. 15. (Published Sep. 19, 2006).

MENON1 et al."Enforcing Isolation and Ordering in STM", Retrieved at<<http://www.cs.washington.edu/homes/djg/papers/tm_pldi07.pdf>>, p. 11. (Published Jun. 11, 2007).

ISARD† et al."Semantics of Transactional Memory and Automatic Mutual Exclusion", Retrieved at<<http://research.microsoft.com/~tharris/papers/2008-popl.pdf>>, p. 12. (Published Jan. 10, 2008).

\* cited by examiner

STM WITH GLOBAL VERSION OVERFLOW HANDLING

BACKGROUND

Computer programs may be written to allow different portions (e.g., threads) of the program to be executed concurrently. In order to execute different portions of the program concurrently, the computer system or the program typically includes some mechanism to manage the memory accesses of the different portions to ensure that the portions access common memory locations in the desired order.

Transactional memory systems allow programmers to designate transactions in a program that may be executed as if the transactions are executing in isolation (i.e., independently of other transactions and other sequences of instructions in the program). Transactional memory systems manage the memory accesses of transactions by executing the transactions in such a way that the effects of a transaction may be rolled back or undone if two or more transactions attempt to access the same memory location in a conflicting manner. Transactional memory systems may be implemented using hardware and/or software components.

Many software transactional memory (STM) systems allow programmers to include both transactional and non-transactional code in their programs. In order to be practically efficient and pay-for-play, STM systems may provide weak atomicity where no general guarantee is made for interaction between transactional and non-transactional code. However, some commonly used code idioms, such as forms of privatization and publication, may behave incorrectly in STM systems with weak atomicity if privatization safety and publication safety are not provided. In addition, memory locations in STM systems with weak atomicity may be locked and managed with a granularity that covers more than one individually accessible memory location. For example, STM systems may operate with an object-based granularity where locking and conflict management occur at an object level and include all fields of an object. In such systems, an STM system may provide granular safety to ensure that transactional accesses to one field of an object do not adversely affect non-transactional access to another field of the object. Although STM systems may provide safety properties such as privatization, publication, and granular safety, these safety properties typically introduce at least some cost, overhead, and/or complexity into STM systems.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

A software transactional memory system is provided with global version counter overflow handling. The system includes a global version counter with an epoch number and a version number. The system accesses the global version counter prior to and subsequent to memory accesses of transactions to validate read accesses of the transaction. The system includes mechanisms to detect global version number overflow and may allow some or all transactions to execute to completion subsequent to the global version number overflowing. The system also provides publication, privatization, and granular safety properties.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
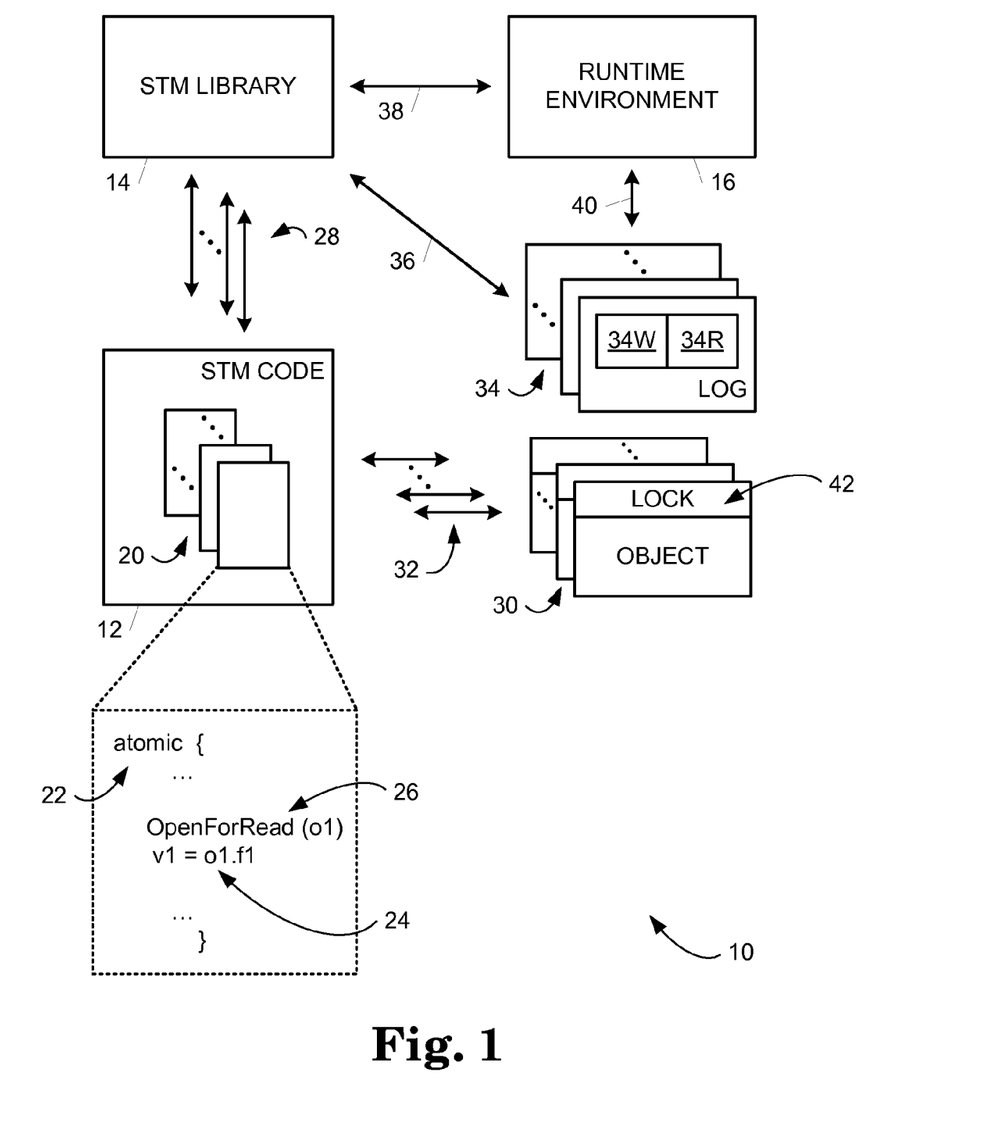
FIG. 1 is a block diagram illustrating an embodiment of a software transactional memory system.

FIG. 1 is a block diagram illustrating an embodiment of a software transactional memory (STM) system 10. STM system 10 represents a runtime mode of operation in a computer system, such as computer system 200 shown in FIG. 9 and described in additional detail below, where the computer system is executing instructions to run STM code 12.

STM system 10 includes STM code 12, an STM library 14, and a runtime environment 16. STM system 10 is configured to manage the execution of STM transactions 20 that form atomic blocks in STM code 12 to allow transactions 20 to be executed atomically and, if desired, to rollback or undo changes made by transactions 20. To do so, STM system 10 tracks memory accesses by transactions 20 to objects 30 using a log 34 for each executing transaction 20.

STM code 12 includes a set of one or more transactions 20. Each transaction 20 includes a sequence of instructions that is designed to execute atomically, i.e., as if the sequence is executing in isolation from other transactions 20 in STM code 12. Each transaction 20 includes an atomic block designator 22 that indicates that a corresponding portion of STM code 12 is a transaction 20. Each transaction 20 also includes zero or more memory accesses 24 that read from and/or write to one or more objects 30 as indicated by arrows 32. Transactions 20 also include invocations 26 of STM primitives, which may be added by a compiler such as a compiler 122 shown in FIGS. 8 and 9 and described in additional detail below, that call functions in STM library 14. The STM primitives of STM library 14 return results to transactions 20 as indicated by function calls and returns 28.

STM library 14 includes STM primitives and instructions executable by the computer system in conjunction with runtime environment 16 to implement STM system 10. The STM primitives of STM library 14 that are callable by transactions 20 include management primitives that implement start, commit, and abort functions in STM library 14. A transaction 20 calls the start function to initiate the management of the transaction 20 by STM library 14. A transaction 20 calls the commit function to finalize the results of the transaction 20 in memory system 204, if successful. A transaction 20 calls the abort function to roll back or undo the results of the transaction 20 in memory system 204.

The STM primitives of STM library 14 that are callable by transactions 20 also include memory access primitives that manage accesses to objects 30 that are written and/or read by a transaction 20. The memory access primitives access a set of one or more transactional locks 42 for each object 30. In one embodiment, STM system 10 uses the object header of objects 30 to store the corresponding transactional locks 42. Each transactional lock 42 indicates whether a corresponding object 30 or portion of a corresponding object 30 is locked or unlocked for writing and/or reading. When an object 30 is locked for writing, the corresponding transactional lock 42 includes an address or other reference that locates an entry for the object 30 in a write log 34W in one embodiment. When an object 30 is locked for reading (i.e., in response to a pessimistic read access), the corresponding transactional lock 42 includes a version number of the object 30 determined from a global version number 51B (shown in FIG. 2) and a pessimistic read counter (e.g., to allow multiple concurrent read accesses to the object 30). When an object 30 is not locked for writing or reading, the corresponding transactional lock 42 includes a version number of the object 30 determined from global version number 51B in this embodiment.

For each non-array object 30, the memory access primitives may access a single transactional lock 42 that locks or unlocks the non-array object 30 for writing and/or reading. For each array object 30, the memory access primitives may access a set of one or more transactional lock 42 where each transaction lock 42 in the set locks or unlocks a corresponding portion of the array object 30 for writing and/or reading. Runtime environment 16 creates and manages the transactional lock(s) 42 for each object 30. In other embodiments, separate transactional locks 42 may be used for different portions of objects 30.

The memory access primitives of STM library 14 generate and manage a set of one or more STM logs 34 for each transaction currently being executed. Each set of STM logs 34 includes a write log 34W and a read log 34R in one embodiment. Each write log 34W includes an entry for each object 30 that is written by a transaction 20 where each entry includes an address of a corresponding object 30, the version number from the transactional lock 42 of the corresponding object 30, and an address or other reference that locates a shadow copy of the corresponding object 30. Each read log 34R includes an entry for each object 30 that is read by a transaction 20 where each entry includes a reference that locates the transactional lock 42 of a corresponding object 30.

Runtime environment 16 may be any suitable combination of runtime libraries, a virtual machine (VM), an operating system (OS) functions, such as functions provided by an OS 222 shown in FIG. 9 and described in additional detail below, and/or compiler functions, such as functions provided by compiler 122 shown in FIGS. 8 and 9 and described in additional detail below.

Figure 2:
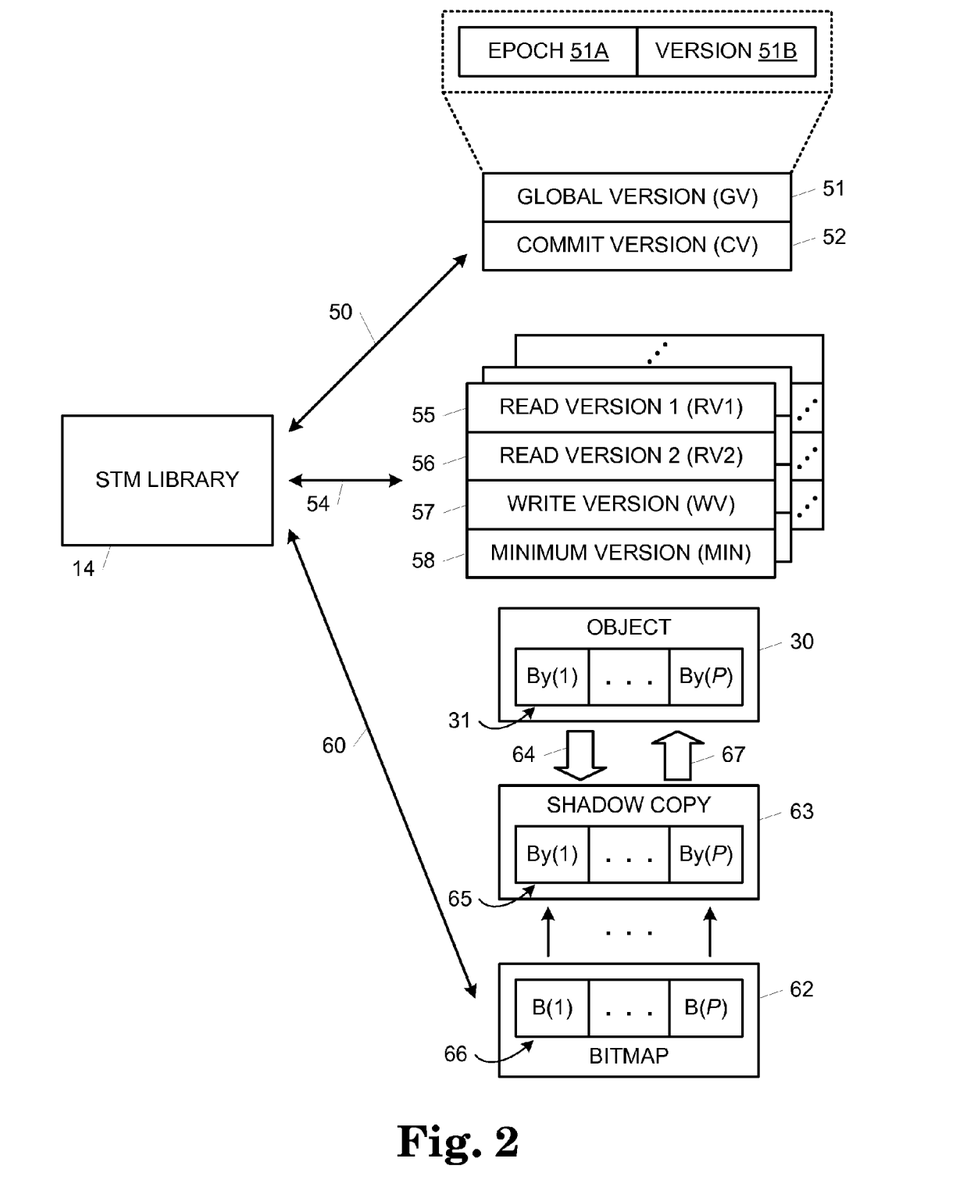
FIG. 2 is a block diagram illustrating an embodiment of variables generated and used by a software transactional memory system.

In one embodiment, STM system 10 provides weak atomicity between transactional code (i.e., transactions 20) and non-transactional code in STM code 12 and performs locking and conflict management of objects 30 at an object granularity for non-array objects 30 or at a portion of an object granularity for array objects 30. With weak atomicity, STM system 10 does not provide any general guarantees for interactions between transactional and non-transactional code when STM code 12 is executed. To prevent incorrect code behaviors that may occur with weak atomicity, STM system 10 provides safety properties that include privatization, publication, and granular safety. STM system 10 implements these safety properties by generating and using global, transaction, and object variables to manage the execution of transactions 20 as shown in FIG. 2.

The global variables generated by STM system 10, as indicated by an arrow 50, include a global version (GV) counter 51 and a commit version (CV) counter 52. GV 51 represents a time-stamp of the most recently completed transaction 20 and is used to provide a version number to each transaction 20. In one embodiment, GV 51 is a 64-bit quad word where the most-significant (64-N) bits represent an epoch number (EPOCH) 51A and the least-significant N bits represents a version number (VERSION) 51B where N is the maximum number of bits allowed to represent a version number stored in the transactional lock 42 of an object 30. In other embodiments, GV 51, epoch number 51A, and version number 51B may have other suitable sizes.

Epoch number 51A and version number 51B are initialized to zero or other known values. Version number 51B is incremented as part of the validation and commit process by each transaction 20 as described in additional detail below. Epoch number 51A is incremented each time version number 51B overflows. Epoch number 51A may be incremented automatically in response to an atomic increment of GV 51 that causes version number 51B to overflow in one embodiment.

STM system 10 uses GV 51 to implement global versioning for transactions 20. With global versioning, STM system 10 may guarantee that a given transaction 20 can detect conflicting writes by other transactions 20 that commit after the given transaction 20 starts. As a result, STM system 10 uses the global versioning from GV 51 to ensure publication safety.

Because version number 51B has a relatively small number of bits in some embodiments, version number 51B may overflow in response to version number 51B being incremented when the value of version number 51B has reached a maximum value that may be represented by the number of bits of version number 51B. With a relatively small number of bits (e.g., where the size of version number 51B is limited by the number of bits of a transactional lock 42 that are available to store a version number), version number 51B may overflow with some frequency, particularly where STM system 10 executes a relatively large number of transactions 20.

If all transactions 20 continue to execute subsequent to version number 51B overflowing, STM system 10 may fail to detect conflicts between transactions 20 in some instances and falsely detect conflicts between transactions 20 in other instances. As a result, some conflicting transactions 20 may commit incorrectly, rather than rolling back and re-executing, and other consistent transactions 20 may roll back and re-execute unnecessarily, rather than committing.

In one embodiment, STM system 10 rolls back and re-executes all executing transactions 20 in response to version number 51B overflowing, i.e., in response to epoch number 51A incrementing when version number 51B (i.e., GV 51) is incremented. In other embodiments, STM system 10 may manage transactions 20 in other suitable ways in response to version number 51B overflowing to prevent conflicts from going undetected and/or prevent false conflicts from being detected.

CV counter 52 represents the version number of the transaction 20 whose turn it is to commit and is a K bit integer. CV counter 52 is compared to the least-significant K bits of write version numbers of transactions 20 (assigned from GV 51) to determine the commit order of transactions 20. In one embodiment, CV counter 52 is a 32-bit double word that is initialized to one (i.e., K is equal to 32). In other embodiments, CV counter 52 is another size and/or is initialized to another suitable value. STM system 10 uses CV counter 52 to serialize the commits of transactions 20 and ensure privatization safety in conjunction with the buffering of write accesses.

The transaction variables generated by STM system 10, as indicated by an arrow 54, include a first read version (RV1) 55, a second read version (RV2) 56, a write version (WV) 57, and a minimum version (MIN) 58. For each transaction 20, STM system 10 stores the value of GV 51 as RV1 55 when a transaction 20 begins. For a read only transactions 20, STM system 10 stores the value of GV 51 as RV2 56 after a transaction 20 completes any memory accesses but before the transaction 20 validates and commits. For read and write transactions 20, STM system 10 stores an atomically incremented value of GV 51 as WV 57 and stores a decremented version of WV 57 as RV2 56 (i.e., RV2=WV−1) after a transaction 20 completes any memory accesses but before the transaction 20 validates and commits.

STM system 10 initially stores a maximum possible version number of all objects 30 as MIN 58 and updates MIN 58 for each pessimistic read access and read-after-write access (i.e., a read access to an object 30 that has already been accessed for writing by the same transaction 20) as follows. For each read-after-write access, STM system 10 accesses the stored version number of the object 30 that is being read from log 34W and updates MIN 58 to be equal to the stored version number of the object 30 if the stored version number is greater than RV1 55 and is less than MIN 58. For each pessimistic read access that is not write locked or is write locked by the current transaction 20 or other transactions 20 in the same transaction nest as the current transaction 20, STM system 10 accesses the version number of the object 30 that is being read from transactional lock 42 and updates MIN 58 to be equal to the version number from transactional lock 42 if the version number from transactional lock 42 is greater than RV1 55 and is less than MIN 58.

The object variables generated by STM system 10, as indicated by an arrow 60, include a bitmap 62 for each object 30 that is written. STM system 10 is configured to operate in a buffered write mode of operation. In the buffered write mode of operation, STM library 14 causes a shadow copy 63 to be made for each object 30 that is written by a transaction 20 as indicated by an arrow 64. Transaction 20 performs all writes for an object 30 to the shadow copy 63 rather than to the object 30 directly.

Each object 30 includes any number of fields that encompass a set of bytes By(1) through By(P) 31, where P is greater than or equal to one and represents the Pth byte 31, that correspond to bytes By(1) through By(P) 65 in a shadow copy 63 when the shadow copy 63 is populated. For each shadow copy 63, a corresponding bitmap 62 includes bits B(1) through B(P) 66 such that there is a one-to-one correspondence between bits 66 and bytes 65.

With eager population of shadow copies 63 (i.e., objects 30 are copied into shadow copies 63 when the shadow copies 63 are created), STM library 14 sets each bit 66 to indicate whether a corresponding byte 65 has been written by a transaction 20. When a transaction 20 commits, STM library 14 copies only those bytes 65 that have been written (i.e., modified) by transaction 20 back into the corresponding bytes 31 in object 30 as indicated by an arrow 67.

With lazy population of shadow copies 63 (i.e., portions of objects 30 are copied into shadow copies 63 only when first read by a transaction 20), STM library 14 sets each bit 66 to indicate whether a corresponding byte 65 has been read or written by a transaction 20. When STM library 14 performs a read with lazy population, if the corresponding bits 66 are not set, STM library 14 populates the corresponding portion of the shadow copy 63 from the object 30 and sets the corresponding bits 66 in bitmap 62. STM library 14 then reads from the shadow copy 63. When STM library 14 performs a write with lazy population, STM library 14 sets the corresponding bits 66 in bitmap 62 and then writes directly to the shadow copy 63. When a transaction 20 commits, STM library 14 copies only those bytes 65 that have been accessed by transaction 20 back into the corresponding bytes 31 in object 30 as indicated by arrow 67.

In another embodiment, STM library 14 may use two bitmaps 62 (not shown) when a shadow copy 63 is created. STM library 14 uses one of the bitmaps 62 as a write bitmap for writes and the other of the bitmaps 62 as a read bitmap for reads. During commit, STM library 14 commits the portions of shadow copies 63 with corresponding bits set in the write bitmaps.

By using bitmaps 62, STM library 14 prevents any bytes 31 in objects 30 that have been written by non-transactional code during a transaction 20 from being undesirably overwritten by the transaction 20. Bitmaps 62, therefore, provide granular safety in STM system 10.

Figure 3:
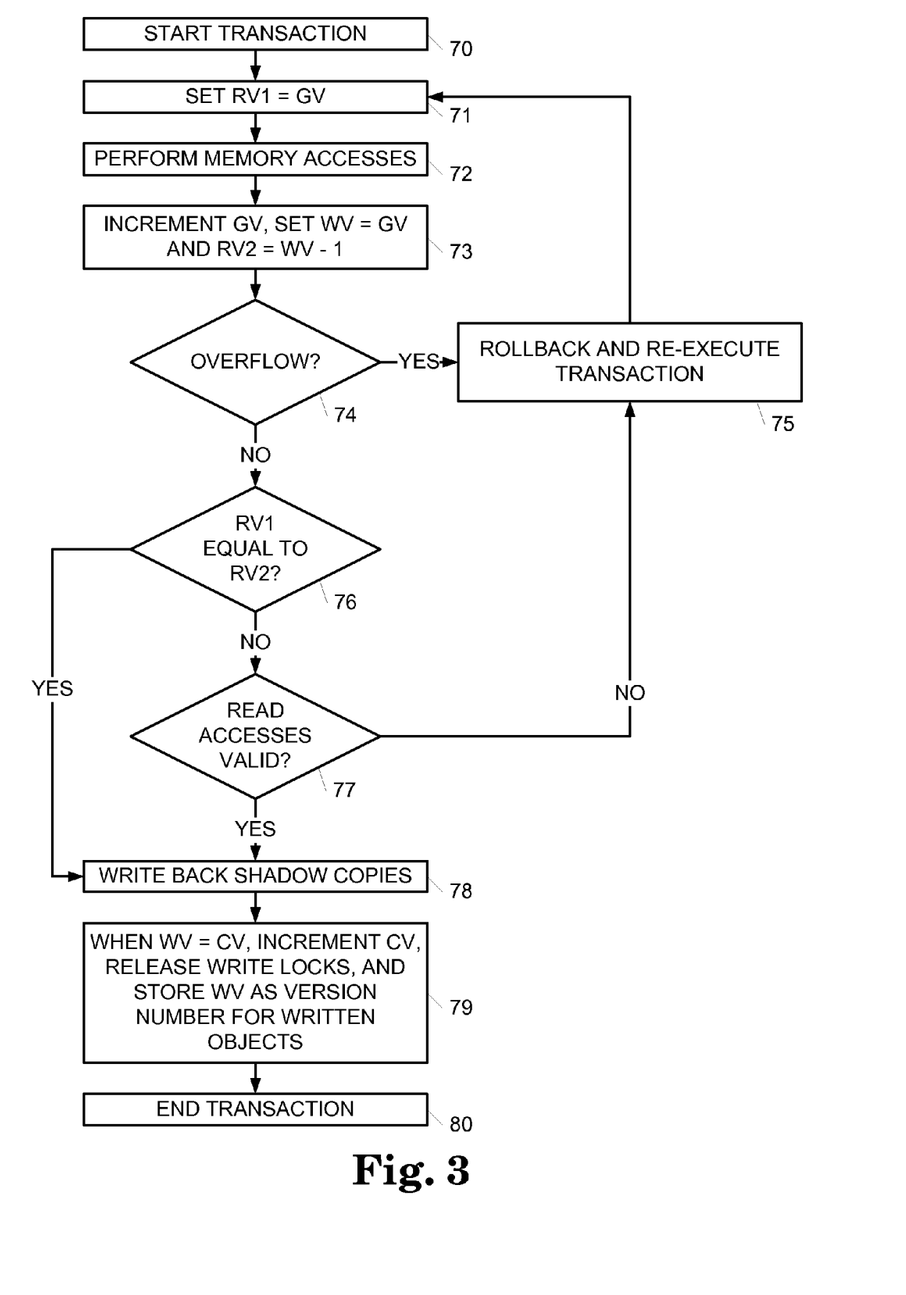
FIG. 3 is a flow chart illustrating an embodiment of a method for executing a transaction in a software transactional memory system.

FIG. 3 is a flow chart illustrating an embodiment of a method for executing a transaction 20 in a STM system 10. STM library 14 performs the following algorithm using the global, transaction, and object variables shown in FIG. 2 to execute each transaction 20.

In FIG. 3, a transaction 20 is started in STM system 10 as indicated in a block 70. When the transaction 20 starts, STM library 14 creates variables RV1 55, RV2 56, WV 57, and MIN 58 for the transaction 20. STM system 10 accesses GV 51 and sets RV1 55 equal to the value of GV 51 prior to performing any memory accesses as indicated in a block 71.

STM library 14 then allows the transaction 20 to execute and perform any write and/or read memory accesses to objects 30 as indicated in a block 72.

To access an object 30 for writing, the transaction 20 invokes a memory access primitive that opens the object 30 for writing. STM library 14 acquires a transactional lock 42 corresponding to the object 30 for the transaction 20 if the lock is available. If the object 30 is not available (i.e., the object 30 is locked by another transaction 20), then STM library 14 detects a conflict between the current transaction 20 and the other transaction 20 and may rollback and re-execute the current transaction 20. If the object 30 is locked by the current transaction 20, then STM library 14 has already acquired the transactional lock 42 corresponding to the object 30 for the transaction 20. Once a corresponding transaction lock 42 is acquired, STM library 14 causes each write access 32 to be made to a shadow copy 63 of a corresponding object 30, causes an entry corresponding to the write access 32 to be stored in log 34W, and causes corresponding bits 66 in a corresponding bitmap 62 to be set. In one embodiment, the shadow copy 63 may be stored in log 34W for non-array objects 30 and the shared shadow copy 63 may be stored separately from log 34W for array objects 30. In other embodiments, the shadow copy 63 and shared shadow copy 63 may be stored in other suitable locations.

To access an object 30 for reading, the transaction 20 invokes a memory access primitive that opens the object 30 for reading. If the object 30 is not locked, STM library 14 causes an entry corresponding to the read access to be stored in read log 34R. If the read access is a pessimistic read access, STM library 14 also acquires a transactional lock 42 for the object 30. If the object 30 is locked for write access by another transaction 20, then STM library 14 detects a conflict between the current transaction 20 and the other transaction 20 and may rollback and re-execute the current transaction 20. If the object 30 is locked by the current transaction 20, then STM library 14 may cause an entry corresponding to the read access to be stored in read log 34R or set a flag corresponding to the object 30 in write log 34W to indicate that the object 30 was also read. STM library 14 causes a read access 32 that occurs before a designated object 30 has been opened for writing by the transaction 20 to be made directly from the corresponding object 30. STM library 14 causes each read access 32 that occurs after a designated object 30 has been opened for writing by a transaction 20 to be made from the corresponding shadow copy 63.

After all memory accesses have been performed but before validating read accesses, STM library 14 again accesses GV 51. STM library 14 atomically increments GV 51, sets WV 57 equal to the incremented value of GV 51, and sets RV2 56 equal to the WV 57 minus one (i.e., the non-incremented value of GV 51) as indicated in a block 73. STM library 14 determines whether version number 51B has overflowed since the transaction 20 began by comparing the epoch number in RV1 55 (e.g., the uppermost 64-Nbits) to the epoch number in RV2 56 (e.g., the uppermost 64-Nbits) as indicated in a block 74. If version number 51B has overflowed, then STM library 14 rolls back and re-executes transaction 20 as indicated in a block 75. To roll back transaction 20, STM library 14 uses log 34W to cause the shadow copies 63 to be discarded and stores the version numbers in log 34W as the version numbers of the corresponding objects 30. STM library 14 then repeats the functions of at least blocks 71 through 74 in re-executing the transaction 20.

If version number 51B has not overflowed, then STM library 14 determines whether RV1 55 is equal to RV2 56 as indicated in a block 76. If RV1 55 is equal to RV2 56, then GV 51 has not changed since the current transaction began which indicates that no other transactions 20 have started commit processing subsequent to the current transaction 20. Accordingly, STM library 14 detects that all read accesses of the current transaction 20 are consistent without further validating the read accesses.

If RV1 55 is not equal to RV2 56, then STM library 14 attempts to further validate the read accesses of the transaction 20 using RV1 55, RV2 56, and MIN 58, and log 34R as indicated in a block 77.

Figure 4A:
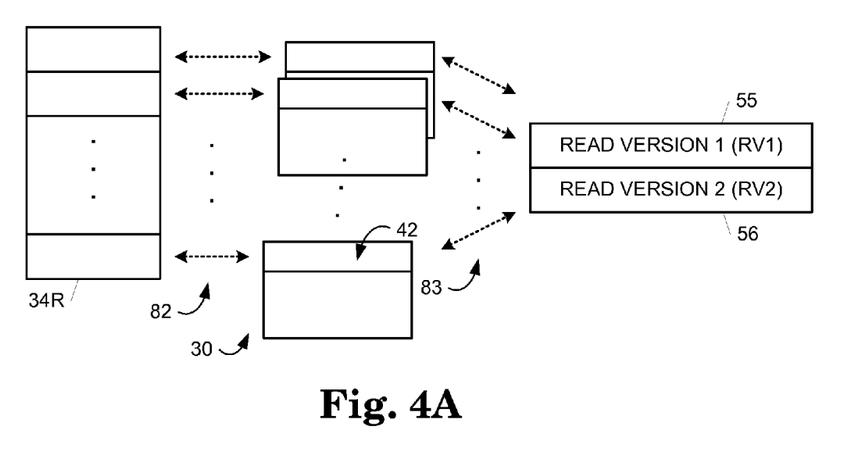
FIGS. 4A-4B are block diagrams illustrating embodiments of validating read accesses.

To validate optimistic read accesses, STM library 14 compares the current version number in a corresponding transaction lock 42 for each object 30 indicated in read log 34R as indicated by arrows 82 to RV1 55 and RV2 56 as indicated by arrows 83 in FIG. 4A. If a current version number is less than or equal to RV1 55, then the corresponding object 30 has not been changed since the current transaction 20 began and the read access is consistent. If a current version number is greater than RV2 56, then the corresponding object 30 also has not been changed since the current transaction 20 began and the read access is consistent. STM library 14 determines that the read access is consistent because no other transaction 20 has been given a commit version (i.e., an incremented value of GV 51) higher than RV2 56 in the present epoch and thus, the current version number was produced by a transaction 20 from a previous epoch (i.e., a transaction 20 with a different epoch value than the current transaction 20).

If a current version number is greater than RV1 55 and less than or equal to RV2 56, then STM library 14 determines that the read access is inconsistent. In this case, the current version number of the corresponding object 30 was either produced by a concurrent transaction 20 or by a transaction 20 in a previous epoch. Because STM library 14 cannot readily determine whether the current version number of the corresponding object 30 was produced in the present or a previous epoch, STM library 14 conservatively determines that the read access is inconsistent.

With the above validation scheme for optimistic reads, the range of values between RV1 55 and RV2 56 (inclusive of RV2 56) is expected to be small compared to the whole version number range of version number 51B for most cases. As a result, the chance of falsely invalidating a read access (e.g., by invalidating a read access if a current version number of an object 30 is greater than RV1 55 and less than or equal to RV2 56) is likely to also be small.

Figure 4B:
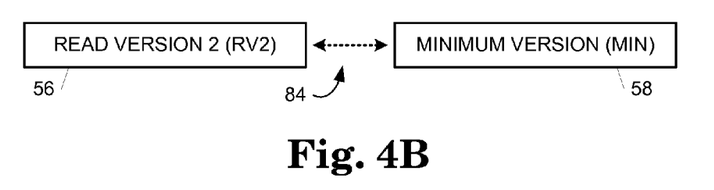

To validate pessimistic read accesses and both optimistic and pessimistic read-after-write accesses, STM library 14 compares MIN 58 to RV2 56 as indicated by an arrow 84 in FIG. 4B. MIN 58 is updated during read accesses as described above. If MIN 58 is less than or equal to RV2 56, STM library 14 determines that at least one pessimistic read or read-after-write access is possibly inconsistent. If at least one pessimistic read or read-after-write access is possibly inconsistent, at least one object 30 associated with a pessimistic read or read-after-write access from the current transaction 20 may have been written by another transaction 20 after the current transaction 20 began but before the object 30 was locked pessimistically by the current transaction 20. Thus, at least one pessimistic read or read-after-write access was to an object 30 with a version number that was greater than RV1 55 and less than or equal to RV2 56. By using MIN 58, STM library 14 avoids validating each pessimistic read and read-after-write access in log 34R individually. In addition, STM library 14 may omit recording the version number of objects 30 for pessimistic read and read-after-write accesses in log 34R.

If any of the read accesses (i.e., the optimistic read accesses, the pessimistic read accesses, or the read-after-write accesses) are not consistent, then STM library 14 determines that a conflict may exist and the read accesses are invalid. If the read accesses are invalid, then STM library 14 rolls back and re-executes the current transaction 20 as indicated in block 75.

If all of the read accesses are consistent, then STM library 14 writes back any shadow copies 63 that were created by the transaction 20 to the corresponding objects 30 using log 34W as indicated in a block 78. As described above, STM library 14 writes back only those fields 65 in the shadow copies 63 that have been written by the transaction 20 as indicated by the corresponding bitmaps 62.

STM library 14 then waits until the value of CV 52 is equal to the value of WV 57. Once the value of CV 52 is equal to the value of WV 57, STM library 14 commits the transaction 20 by incrementing CV 52, releases all acquired transactional locks 42, and stores the value of WV 57 as the version number of all objects 30 that are unlocked as indicated in a block 79. STM library 14 ends the transaction as indicated in a block 80.

For STM transactions 20 that include only read accesses (i.e., do not include any write accesses), STM library 14 modifies the above algorithm to omit incrementing GV 51 and setting WV 57 in block 73. In block 73, STM library 14 accesses GV 51 and sets RV2 56 equal to GV 51. STM library 14 also omits the functions of blocks 78 and 79.

In addition, since a read-only transaction 20 has no way to prevent transactions 20 that start after the read-only transaction 20 from committing while the read-only transaction 20 is validating, STM library 14 reads GV 51 as read version 3 (RV3) (not shown) and performs the function of block 74 with RV3 subsequent to performing the function of block 77 to ensure that another transaction 20 did not cause overflow to occur while the read-only transaction 20 is validating. STM library 14 rolls back and re-executes read-only transactions 20 in response to detecting overflow.

Further, STM library 14 maintains a variable MIN_OPT (not shown) for use with STM transactions 20 that include only read accesses. STM library 14 initializes MIN_OPT to be equal to a maximum possible version number of all objects 30. While validating optimistic read accesses, STM library 14 sets MIN_OPT to be equal to a current version number of an object 30 indicated in read log 34R if the current version number is greater than RV2 56 and less than MIN_OPT. After re-verifying that overflow did not occur, STM library 14 determines that the read-only transaction 20 is inconsistent if MIN_OPT is greater than RV2 56 and less than or equal to RV3. By doing so, STM library 14 ensures that younger read and write transactions 20 did not cause overflow of GV51 prior to a read-only transaction 20 committing. STM library 14 also ensures that younger read and write transactions 20 that commit prior to an older, read-only transaction 20 do not conflict with the older, read-only transaction 20. STM library 14 rolls back and re-executes any inconsistent read-only transactions 20.

For nested transactions 20 (i.e., transactions 20 that are called within another transaction 20), STM library 14 modifies the above algorithm by initializing RV1 55 to be equal to RV1 55 of the top-level transaction 20 and initializing MIN 58 to be equal to MIN 58 of the transaction 20 that called the nested transaction 20. STM library 14 may omit the function of block 77 (i.e., the validation of read accesses) for a nested transaction 20 and rely on the validation of read accesses by the parent or top-level transaction 20 of the nested transaction 20. In addition, STM library 14 updates MIN 58 of a parent transaction 20 each time a nested transaction 20 commits if MIN 58 of the nested transaction is less than MIN 58 of the parent transaction 20. If STM library 14 determines that a nested transaction 20 is inconsistent, STM library 14 rolls back all transactions 20 in the nest including the top-level transaction 20. STM library 14 then re-executes the top-level transaction 20.

In the above embodiments, STM library 14 uses bitmaps 62 to provide granular safety as described above. STM library 14 includes a field barrier that manages bitmaps 62 by setting bit fields 66 for corresponding fields 65 in shadow copies 63 that are written by a transaction 20. STM library 14 executes the field barrier for each write access to ensure granular safety. STM library 14, however, may omit the execution of the field barrier for read accesses while maintaining granular safety. For read-only accesses, STM library 14 does not create a shadow copy 63 and thus, there is no granular safety concern. For read-after-write accesses (i.e., reads of objects 30 that have been previously opened for writing by the same transaction 20), the above embodiments provide consistent read accesses to corresponding shadow copies 63 with bitmaps 62 managed by field barriers corresponding to the write accesses. Accordingly, STM library 14 may omit the field barrier for read accesses and provide granular safety without additional overhead for read accesses where shadow copies 63 are eagerly populated.

In the above embodiments, STM library 14 rolls back and re-executes all executing transactions 20 when overflow of version number 51B occurs. As a result, a large transaction 20 may be unable to finish in a given epoch if many small transactions 20 consume the whole version number space of version number 51B before the large transaction 20 finishes.

In another embodiment, STM library 14 includes an epoch barrier that may allow executing transactions 20, including any large transactions 20, to commit when overflow of version number 51B occurs. STM library 14 invokes the epoch barrier each time overflow of version number 51B occurs.

Figure 5:
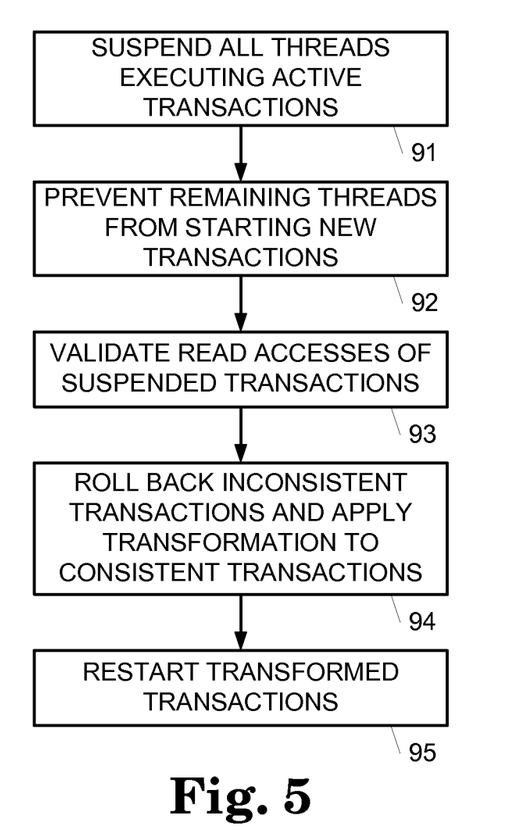
FIG. 5 is a flow chart illustrating an embodiment of a method performed by an epoch barrier that is invoked when global counter overflow occurs.

FIG. 5 is a flow chart illustrating an embodiment of a method performed by an epoch barrier included in STM library 14. As shown in FIG. 5, STM library 14 suspends all threads that are executing active transactions 20 as indicated in a block 91. STM library 14 also prevents any remaining threads from starting new transactions as indicated in a block 92. STM library 14 validates the read accesses of each suspended transaction 20 as indicated in a block 93.

STM library 14 rolls back any inconsistent transactions 20 and applies a transformation to consistent transactions 20 as indicated in a block 94. STM library 14 transforms the consistent transactions 20 by setting RV1 55 in each consistent transaction 20 to zero, setting the version number in transactional lock 42 of each object 30 that is in a read log 34R of one or more of the consistent transactions 20 to zero, and setting the version number in each entry of each write log 34W of the consistent transactions 20 to zero. By setting all write log entries to zero, STM library 14 causes any of the transactions 20 that may roll back later to set the version numbers of corresponding objects 30 to zero. STM library 14 also sets MIN 58 to zero.

After the transformations have been applied, STM library 14 restarts execution of the transformed transactions 20 as indicated in a block 95. By doing so, STM library 14 allows the transformed transactions 20 to execute to completion by either committing or detecting a conflict and rolling back.

After all transformed transactions 20 complete, STM library 14 completes the epoch barrier and resumes normal execution.

In another embodiment, STM library 14 manages a global version number range to allow transactions 20 to complete regardless of when global version number overflow occurs. In this embodiment, GV 51 forms a single version number value with a range a range of [0, MAX_GV] where MAX_GV is the maximum value that may be represented by GV 51. GV 51 is not subdivided into epoch 51A and version number 51B as shown in the embodiment of FIG. 2 in this embodiment. STM system 10 generates and uses the variables shown in FIG. 6 in addition to those shown in FIG. 2.

Figure 6:
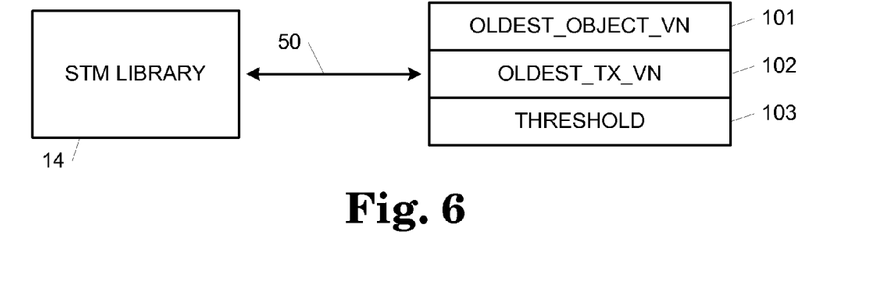
FIG. 6 is a block diagram illustrating an embodiment of variables generated and used by a software transactional memory system that allows transactions to complete regardless of when global version number overflow occurs.

The variables generated by this embodiment of STM system 10 include an oldest object version number (OLDEST_OBJECT_VN) 101, an oldest transaction version number (OLDEST_TX_VN) 102, and a threshold value 103 as indicated by arrow 50. Oldest object version number 101 is the oldest version number (other than zero) for any object 30 in the heap (i.e., the oldest version number stored in a transaction lock 42 of an object 30 or a log 34W). Oldest transaction version number 102 is the oldest version number among all active transactions 20 (i.e., the oldest value of GV 51 assigned to an active transaction 20). Threshold value 103 is a threshold value that is used to set a maximum size of the global version number range (i.e., the set of values between oldest object version number 101 and GV 51 inclusive).

In one embodiment, STM system 10 initializes the version number of each object 30 to a special reserved value not in the range [0, MAX_GV], e.g. MAX_GV+1, to indicate that the object 30 has not been written. In other embodiments, instead of using the range [0, MAX_GV], STM system 10 uses the range [1, MAX_GV] and reserves the value of zero to denote objects that have not yet been written. Since zero is less than any other values in the global version number range of GV 51, the use of zero may expedite some of the validation tests and may also be advantageous when allocating new objects 30 and initializing the state of new objects 30 to all-zeros.

In the embodiments described below, STM system 10 uses zero as the special version number value for new objects 30. In addition, STM system 10 handles all ranges of values and comparisons based on logical values rather than actual values. For example, the actual value of GV 51 may be less than the actual value of oldest object version number 101 after GV 51 overflows and is wrapped.

In this embodiment, STM system 10 initializes oldest object version number 101 to be zero and initializes oldest transaction version number 102 and GV 51 to be one. STM system 10 maintains the following invariants during execution of transactions 20. Each object 30 in the heap has a version number (VN) such that either oldest object version number 101 is less than or equal to VN which is less than or equal to GV 51 or VN is equal to zero. Each active transaction 20 has a version number such that oldest transaction version number 102 is less than or equal to RV1 55 which is less than or equal to GV 51. For each active transaction 20, the version numbers of objects 30 in read log 34R contain version numbers in the range between oldest object version number 101 and GV 51 inclusive. When a transaction 20 commits, the transaction 20 stamps the transaction lock 42 of objects 30 with version numbers in the range between oldest transaction version number 102 and GV 51 inclusive.

Figure 7:
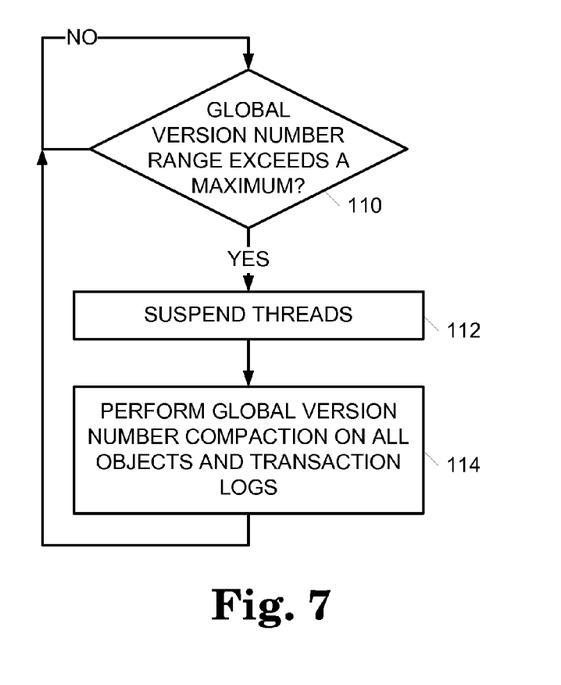
FIG. 7 is a flow chart illustrating an embodiment of a method for managing a global version number range.

FIG. 7 is a flow chart illustrating an embodiment of a method for managing the global version number range. STM library 14 determines whether the global version number range exceeds a maximum size as indicated in a block 110. STM library 14 determines that the global version number range exceeds a maximum size if the number of values between oldest object version number 101 and GV 51 inclusive exceeds the maximum value that may be represented by GV 51 (i.e., MAX_GV) minus threshold value 103.

Any time that the global version number range exceeds a maximum, STM library 14 suspends all threads as indicated in a block 112 and performs global version number compaction on all objects 30 and transaction logs 34. In one embodiment, STM library 14 performs the compaction by traversing the heap and replacing all version numbers in objects 30 and transaction logs 34 that are greater than or equal to oldest object version number 101 and less than oldest transaction version number 102 with zero and by setting oldest object version number 101 equal to oldest transaction version number 102. In another embodiment, STM library 14 performs the compaction by traversing the heap and replacing all version numbers in objects 30 and transaction logs 34 that are greater than or equal to oldest object version number 101 and less than oldest transaction version number 102 with oldest transaction version number 102.

These embodiments do not roll back and re-execute transactions when GV 51 overflows. In addition, these embodiments may be integrated with a garbage collection infrastructure that suspends threads and traverses the heap. Accordingly, global version number compaction may be performed as part of garbage collection or concurrently with garbage collection.

The above embodiments unify the global version and the commit ticket into an algorithm by using global version counter 51. The read access validation algorithm may account for any global version overflow to avoid false invalidations and avoid traversing the heap to re-number all objects 30 after each global version overflow. The above embodiments may also ensure granular safety for an STM system without changing read accesses.

The above embodiments of STM system 10 implement encounter-time locking (ETL) by locking objects 30 when objects 30 are written (e.g., while performing memory accesses in block 72 of FIG. 3). In other embodiments, STM system 10 implements commit-time locking (CTL) where objects 30 are locked by transactions 20 when transactions 20 begin commit processing (e.g., subsequent to block 72 and prior to block 73 in FIG. 3). In these embodiments, write logs 34W include a list of write accesses to objects 30 that are locked using transaction locks 42 when corresponding transactions 20 begin commit processing. STM system 10 detects a conflict if any objects 30 identified in a write log 34W of a transaction 20 are locked, as indicated in corresponding transaction locks 42, when the transaction 20 begins commit processing.

Figure 8:
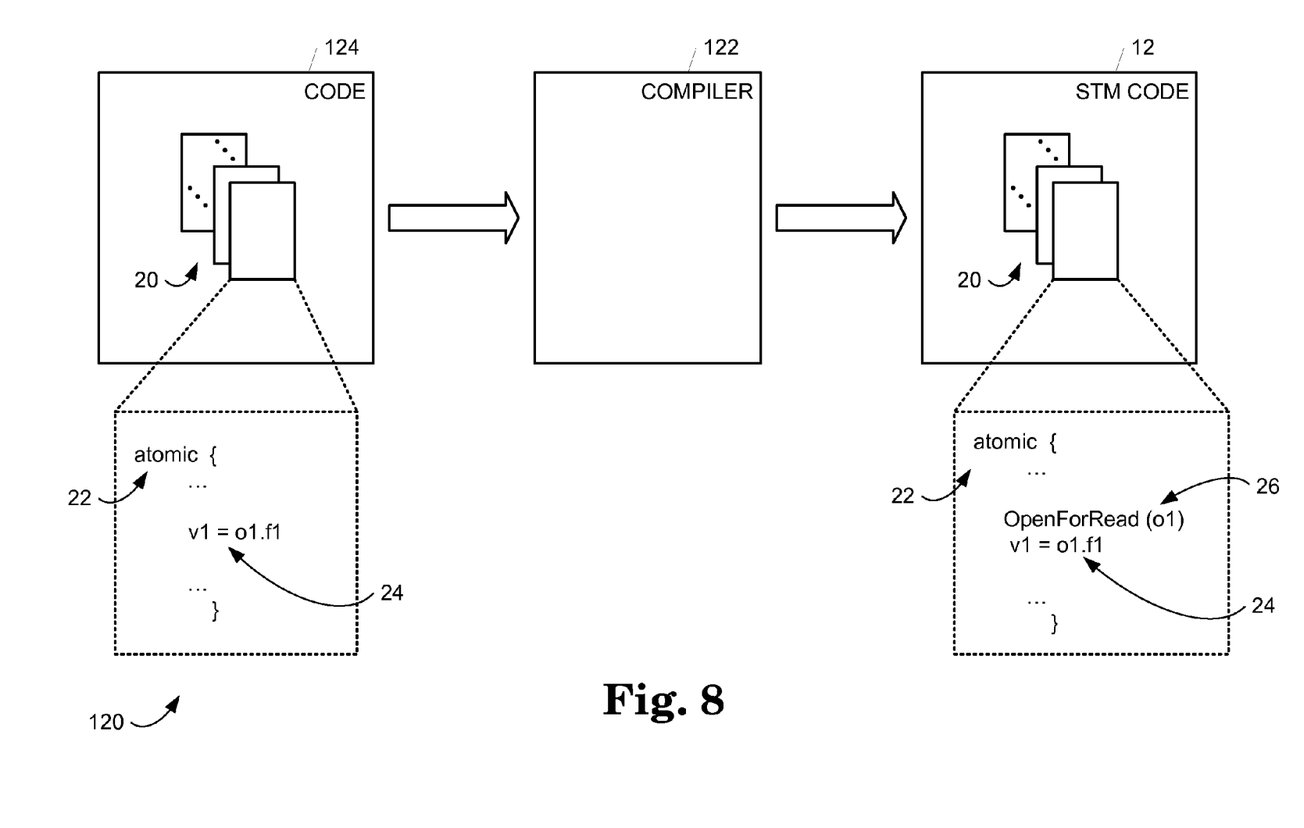
FIG. 8 is a block diagram illustrating an embodiment of a compiler system with a compiler that is configured to compile source code with software transactional memory transactions.

FIG. 8 is a block diagram illustrating an embodiment of a compiler system 120 with a compiler 122 that is configured to compile source code 124 with STM transactions 20.

Compiler system 120 represents a compile mode of operation in a computer system, such as computer system 200 shown in FIG. 9 and described in additional detail below, where the computer system is executing instructions to compile code 124 into STM code 12. In one embodiment, compiler system 120 includes a just-in-time (JIT) compiler system that operates in the computer system in conjunction with a runtime environment executed by an operating system (OS), such as OS 222 shown in FIG. 9 and described in additional detail below, STM library 14, and any additional runtime libraries (not shown). In another embodiment, compiler system 120 includes a stand-alone compiler system that produces STM code 12 for execution on the same or a different computer system.

Code 124 includes a set of one or more STM transactions 20. Each STM transaction 20 includes an atomic block designator 22 that indicates to compiler 122 that a corresponding portion of code 124 is an STM transaction 20. Each STM transaction 20 may include zero or more memory accesses 24 that read from and/or write to an object 30. Code 124 may be any suitable source code written in a language such as Java or C# or any suitable bytecode such as Common Intermediate Language (CIL), Microsoft Intermediate Language (MSIL), or Java bytecode.

Compiler 122 accesses or otherwise receives code 124 with transactions 20 that include memory accesses 24. Compiler 122 identifies memory accesses 24 and compiles code 124 into STM code 12 with invocations 26 of STM memory access primitives in STM library 14 for each memory access 24. Compiler 122 performs any desired conversion of the set of instructions of code 124 into a set of instructions that are executable by a designated computer system and includes the set of instructions in STM code 12.

Figure 9:
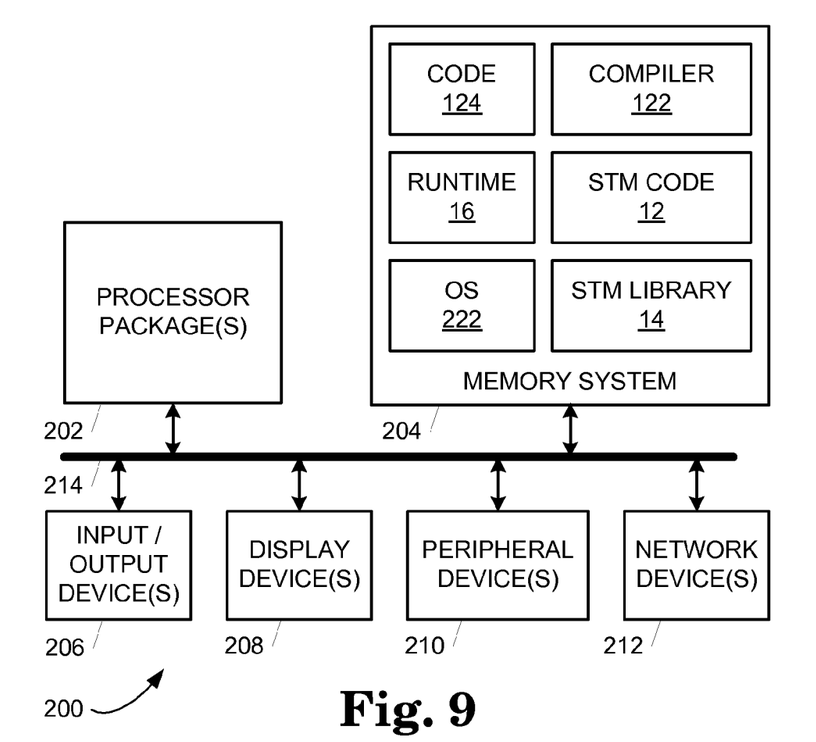
FIG. 9 is a block diagram illustrating an embodiment of a computer system configured to implement a software transactional memory system.

FIG. 9 is a block diagram illustrating an embodiment of a computer system 200 configured to implement STM system 10.

Computer system 200 includes one or more processor packages 202, memory system 204, zero or more input/output devices 206, zero or more display devices 208, zero or more peripheral devices 210, and zero or more network devices 212. Processor packages 202, memory system 204, input/output devices 206, display devices 208, peripheral devices 210, and network devices 212 communicate using a set of interconnections 214 that includes any suitable type, number, and configuration of controllers, buses, interfaces, and/or other wired or wireless connections.

Computer system 200 represents any suitable processing device configured for a general purpose or a specific purpose. Examples of computer system 200 include a server, a personal computer, a laptop computer, a tablet computer, a personal digital assistant (PDA), a mobile telephone, and an audio/video device. The components of computer system 200 (i.e., processor packages 202, memory system 204, input/output devices 206, display devices 208, peripheral devices 210, network devices 212, and interconnections 214) may be contained in a common housing (not shown) or in any suitable number of separate housings (not shown).

Processor packages 202 each include one or more execution cores. Each execution core is configured to access and execute instructions stored in memory system 204. The instructions may include a basic input output system (BIOS) or firmware (not shown), OS 222, STM code 12, STM library 14, runtime environment 16, compiler 122, and code 124. Each execution core may execute the instructions in conjunction with or in response to information received from input/output devices 206, display devices 208, peripheral devices 210, and/or network devices 212.

Computer system 200 boots and executes OS 222. OS 222 includes instructions executable by execution cores to manage the components of computer system 200 and provide a set of functions that allow programs to access and use the components. OS 222 executes runtime environment 16 to allow STM code 12 and STM library 14 to be executed. In one embodiment, OS 222 is the Windows operating system. In other embodiments, OS 222 is another operating system suitable for use with computer system 200.

Computer system 200 executes compiler 122 to generate STM code 12 from code 124. Compiler 122 accesses or otherwise receives code 124 and transforms code 124 into STM code 12 for execution by computer system 200. Compiler 122 performs any desired conversion of the set of instructions of code 124 into a set of instructions that are executable by computer system 200 and includes the set of instructions in STM code 12. Compiler 122 also identifies blocks 20 in code 124 from transaction designators 22 and modifies blocks 20 in STM code 12 to include invocations of STM primitives 26.

In one embodiment, compiler 122 includes a just-in-time (JIT) compiler that operates in computer system 200 in conjunction with OS 222, runtime environment 16, and STM library 14. In another embodiment, compiler 122 includes a stand-alone compiler that produces STM code 12 for execution on computer system 200 or another computer system (not shown).

Computer system 200 executes runtime environment 16 and STM library 14 to allow STM code 12, and transactions 20 therein, to be executed in computer system 200 as described above.

Memory system 204 includes any suitable type, number, and configuration of volatile or non-volatile storage devices configured to store instructions and data. The storage devices of memory system 204 represent computer readable storage media that store computer-executable instructions including STM code 12, STM library 14, runtime environment 16, OS 222, compiler 122, and code 124. The instructions are executable by computer system 200 to perform the functions and methods of STM code 12, STM library 14, runtime environment 16, OS 222, compiler 122, and code 124 as described herein. Memory system 204 stores instructions and data received from processor packages 202, input/output devices 206, display devices 208, peripheral devices 210, and network devices 212. Memory system 204 provides stored instructions and data to processor packages 202, input/output devices 206, display devices 208, peripheral devices 210, and network devices 212. Examples of storage devices in memory system 204 include hard disk drives, random access memory (RAM), read only memory (ROM), flash memory drives and cards, and magnetic and optical disks.

Input/output devices 206 include any suitable type, number, and configuration of input/output devices configured to input instructions or data from a user to computer system 200 and output instructions or data from computer system 200 to the user. Examples of input/output devices 206 include a keyboard, a mouse, a touchpad, a touchscreen, buttons, dials, knobs, and switches.

Display devices 208 include any suitable type, number, and configuration of display devices configured to output textual and/or graphical information to a user of computer system 200. Examples of display devices 208 include a monitor, a display screen, and a projector.

Peripheral devices 210 include any suitable type, number, and configuration of peripheral devices configured to operate with one or more other components in computer system 200 to perform general or specific processing functions.

Network devices 212 include any suitable type, number, and configuration of network devices configured to allow computer system 200 to communicate across one or more networks (not shown). Network devices 212 may operate according to any suitable networking protocol and/or configuration to allow information to be transmitted by computer system 200 to a network or received by computer system 200 from a network.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method performed by a software transactional memory (STM) system in a computer system, the method comprising:
    storing a first read value of a global version counter prior to performing a read access of a first transaction;
    storing a second read value of the global version counter subsequent to performing the read access of the first transaction;
    detecting an overflow of the global version counter in response to a version number in the global version counter being incremented when the version number has reached a maximum value;
    rolling back and re-executing the first transaction that was executing when the overflow occurred in response to detecting the overflow;
    validating the read access using the first read value and the second read value including determining that the read access of the first transaction are consistent in response to the first read value and the second read value being equal;
    if the read access is consistent, write back shadow copies and when write version is equal to commit version, increment commit version and store write version as version number for written objects; and
    if the read access is inconsistent, rolling back and re-executing the first transaction.

2. The method of claim 1 further comprising:
    determining that any additional read accesses of the first transaction are consistent in response to the first read value and the second read value being equal.

3. The method of claim 1 wherein the read access is an optimistic read access.

4. The method of claim 1 further comprising:
    determining that the read access is consistent in response to a current version number corresponding to an object of the read access being less than or equal to the first read value.

5. The method of claim 1 further comprising:
    determining that the read access is consistent in response to a current version number corresponding to an object of the read access being greater than the second read value.

6. The method of claim 1 further comprising:
    determining that the read access is inconsistent in response to a current version number corresponding to an object of the read access being greater than the first read value and less than or equal to the second read value.

7. The method of claim 6 further comprising:
    the rolling back and re-executing the first transaction is in response to the determining that the read access is inconsistent.

8. The method of claim 1 wherein the read access is one of a pessimistic read access or a read-after-write access.

9. The method of claim 1 further comprising:
    storing a maximum possible version number of a set of objects accessible by the STM system as a minimum value;
    updating the minimum value in response to performing the read access, the read access being a pessimistic read access or read-after-write access; and
    determining that at least one of a set of read accesses of the first transaction that includes the read access is inconsistent in response to the minimum value being less than or equal to the second read value.

10. The method of claim 9 further comprising:
    updating the minimum value to be equal to a version number from a write log corresponding to an object of the read access in response to the version number being greater than the first read value and less than the minimum value.

11. The method of claim 9 further comprising:
    updating the minimum value to be equal to a version number of an object of the read access in response to the version number being greater than the first read value and less than the minimum value and the read access being a pessimistic read access.

12. A computer readable storage memory storing computer-executable instructions that, when executed by a computer system, perform a method comprising:
    storing a first read value of a global version counter prior to performing a read access of a first transaction;
    storing a second read value of the global version counter subsequent to performing the read access of the first transaction;
    detecting an overflow of the global version counter in response to a version number in the global version counter being incremented when the version number has reached a maximum value;
    rolling back and re-executing the first transaction that was executing when the overflow occurred in response to detecting the overflow;
    validating the read access using the first read value and the second read value including determining that the read access of the first transaction are consistent in response to the first read value and the second read value being equal;
    if the read access is consistent, write back shadow copies and when write version is equal to commit version, increment commit version and store write version as version number for written objects; and
    if the read access is inconsistent, rolling back and re-executing the first transaction.

13. The computer readable storage memory of claim 12, the method further comprising:
    detecting that the first transaction has a read access that is inconsistent; and
    rolling back and re-executing the first transaction in response to determining that the read access is inconsistent.

14. The computer readable storage memory of claim 12, the method further comprising:
    applying a transformation to a second transaction executing when the overflow occurred; and
    allowing the second transaction to execute to completion subsequent to applying the transformation.

15. The computer readable storage memory of claim 14, the method further comprising:
    validating a set of read accesses of the second transaction prior to applying the transformation.

16. The computer readable storage memory of claim 14, the method further comprising:
    applying the transformation by setting a read version of the second transaction to zero, setting a first version number of a first object in a read log of the second transaction to zero, and setting a second version number in a write log that corresponds to a second object to zero.

17. A method performed by a software transactional memory (STM) system in a computer system, the method comprising:
    determining that a global version number range exceeds a maximum size;

suspending a set of threads being executed by the computer system in response to determining that the global version number range exceeds the maximum size; and performing global version number compaction on a set of objects managed by the STM system and a set of logs corresponding to a set of transactions being executed by the STM system, the global version number compaction including replacing version numbers in the set of objects and the set of logs that are greater than or equal to an oldest object version number and less than an oldest transaction version number.

18. The method of claim 17 further comprising:

replacing a first version number of a first object with one of zero or the oldest transaction version number; and replacing a second version number in a transaction log with one of zero or the oldest transaction version number, the second version number corresponding to a second object.

19. The method of claim 17 further comprising:

performing the global version number compaction as part of garbage collection.

* * * * *